United States Patent
Žemla et al.

(10) Patent No.: US 7,101,451 B2
(45) Date of Patent: Sep. 5, 2006

(54) TIRE BUILDING DRUM WITH A TURN-UP DEVICE AND METHOD FOR PRODUCTION OF GREEN TIRES

(75) Inventors: Jozef Žemla, Púchov (SK); Mário Janovec, Púchov (SK); Štefan Bakoś, Púchov (SK)

(73) Assignee: Matador A. S., Puchov (SK)

( * ) Notice: Subject to any disclaimer, the term of this patent is extended or adjusted under 35 U.S.C. 154(b) by 161 days.

(21) Appl. No.: 10/512,316

(22) PCT Filed: May 6, 2003

(86) PCT No.: PCT/SK03/00010

§ 371 (c)(1),
(2), (4) Date: Oct. 22, 2004

(87) PCT Pub. No.: WO03/095185

PCT Pub. Date: Nov. 20, 2003

(65) Prior Publication Data

US 2005/0115661 A1   Jun. 2, 2005

(30) Foreign Application Priority Data

May 7, 2002   (SK) .................................. 639-2002

(51) Int. Cl.
*B29D 30/32* (2006.01)
(52) U.S. Cl. ........................ 156/132; 156/131; 156/135; 156/398; 156/402; 156/415
(58) Field of Classification Search ................ 156/131, 156/132, 133, 135, 398, 402, 403, 415
See application file for complete search history.

(56) References Cited

U.S. PATENT DOCUMENTS 3,418,192 A   12/1968   Nadler ........................ 156/401
(Continued)

FOREIGN PATENT DOCUMENTS

EP   0 970 802 A   1/2000
(Continued)

*Primary Examiner*—Geoffrey L. Knable
(74) *Attorney, Agent, or Firm*—Ohlandt, Greeley, Ruggiero & Perle, LLP; George W. Rauchfuss, Jr.

(57) ABSTRACT

A tire building drum with a turn-up device for production of unvulcanized tires, consisting of a horizontally disposed central bearing hollow shaft (1) with a driving spindle extending through the centre of the bearing hollow shaft, around which there are arranged two sets of lever arms (26) with rollers (27), between which a mechanism for supporting bead wires from both sides is located at both sides of a vertical symmetry plane, the mechanism consisting of: an axially movably arranged first guiding disc (21) with radially movably arranged clamping bead segments (33), adapted to cooperate with a mechanism for controlling radial lift of clamping bead segments (33), and an axially movably arranged second guiding disc (34) with radially movably arranged supporting bead segments (32), adapted to cooperate with a mechanism for controlling radial lift of the supporting bead segments (32), wherein the clamping bead segment (33) is provided with a space (3) for receiving supporting arms (9, 9a) with a bridge (11) of the supporting bead segment (32) and a bearing surface (7) for simultaneous radial lift of the supporting bead segment (32) with the radial lift of the clamping bead segment (33) by the mechanism for controlling radial lift of the clamping bead segments (33). The invention provides also a method of production of green tyres using this tyre building drum.

14 Claims, 8 Drawing Sheets

U.S. PATENT DOCUMENTS

| | | | |
|---|---|---|---|
| 3,698,987 A | 10/1972 | Appleby et al. | 156/401 |
| 4,131,500 A * | 12/1978 | Wilde et al. | 156/131 |
| 5,223,074 A * | 6/1993 | Miyanaga et al. | 156/398 |
| 5,273,612 A | 12/1993 | Suetomi et al. | 156/398 |
| 6,366,802 B1 | 4/2002 | Haber et al. | 600/174 |
| 2001/0050148 A1 | 12/2001 | Terazono | 156/415 |
| 2002/0011312 A1 | 1/2002 | Tokunga | 156/414 |
| 2002/0104620 A1 | 8/2002 | Sala | 156/414 |
| 2003/0034132 A1 | 2/2003 | DeGraaf et al. | 156/407 |

FOREIGN PATENT DOCUMENTS

| | | |
|---|---|---|
| EP | 1 145 834 A | 10/2001 |
| EP | 1 162 056 | 12/2001 |
| WO | WO 01 08874 A | 2/2001 |
| WO | WO 01 68356 A | 9/2001 |

* cited by examiner

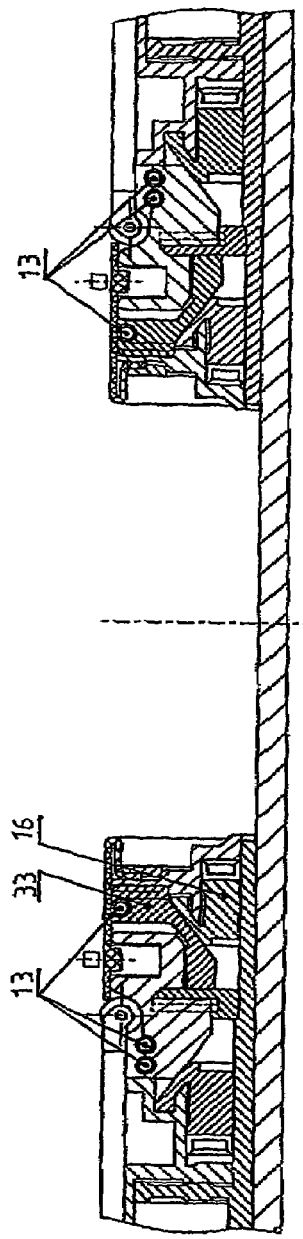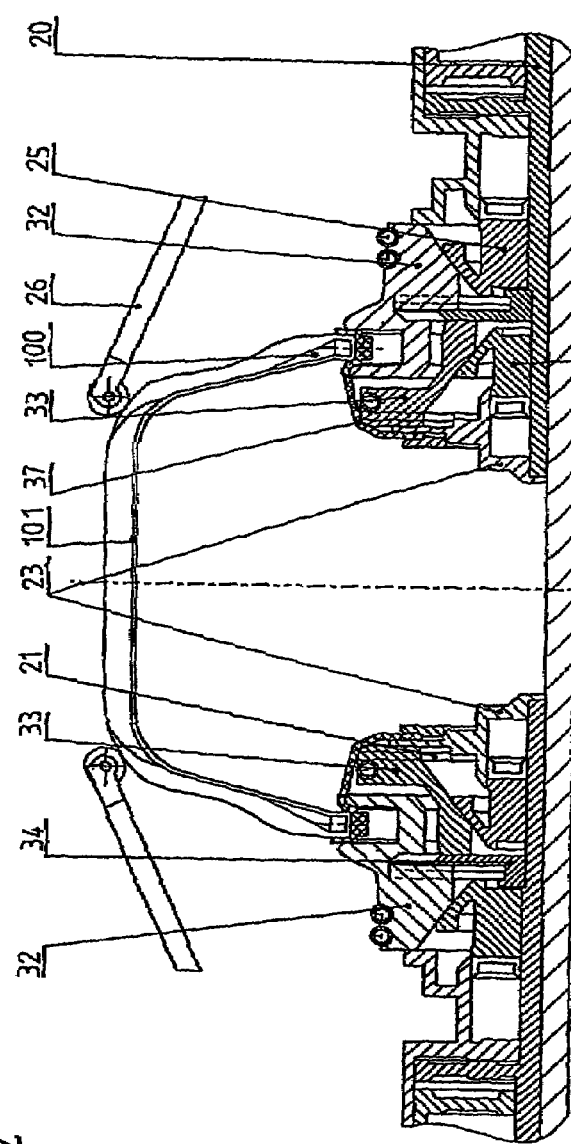
FIG. 2
FIG. 3

TIRE BUILDING DRUM WITH A TURN-UP DEVICE AND METHOD FOR PRODUCTION OF GREEN TIRES

TECHNICAL FIELD

The present invention concerns a tyre building drum with a turn-up device for green tyre production. The tyre building drum is adapted to preserve a stable position of bead wires during the process of green tyre production. The invention concerns also a method of green tyre production.

BACKGROUND ART

During production of green tyres on a tyre building production line the corresponding materials are brought to and wound on a tyre building drum. The drum increases its diameter by radial expansion of clamping mechanisms, whereby the bead wires with cores, which have been prepared in advance in a desired position, are pressed on—are clamped to the carcass materials wound on the tyre building drum. The bead wires with cores should stay in this "clamped" position in the course of subsequent technological process of the green tyre production. During the technological process, additional forces are developed which tend to displace the bead wires from the clamped position both in the direction to the drum centre and in the opposite direction. Relatively high clamping force is needed to clamp the bead wires or to ensure their positional stability during the whole subsequent process of tyre production. As a consequence, undesirable deformation of the carcass materials in the nearest vicinity of the place where the bead wire is clamped, leads to negative impacts on the qualitative properties of the product, because particular components have different properties and expand to different diameters. Displacements of carcass materials occur because of impossibility to synchronise ideally the working movements of two clamping mechanisms.

Recently known methods and the respective devices solve the positional stability of the clamped bead wires by means of a suitable form of seating for clamping it, by means of the so called inner rubber membranes or by means of a mechanical rotary bead support.

EP0303197 describes a method of fitting the bead core rings and a tyre assembling machine comprising a winding drum with variable diameter, two attachable lateral parts arranged in a line, at least one of them being displaceable, and a mechanism for adjusting the bead cores which mechanism is arranged at both ends of the winding drum and adapted for coaxial movement relative to the winding drum. The bead core fitting device comprises a circular holder for accommodating a corresponding bead core ring. The circular holders consist of radially displaceable segments, which are disposed concentrically relative to the winding drum axis. The device further contains sliding rings which are located in a plane parallel to the end faces of the winding drum and concentrically relative to the drum axis, and are able to move axially over the circular holders, when the latter are positioned in a line with the end faces of the winding drum.

Subject-matters of WO98/52740 and WO01/68356 are tyre building drums with a turn-up device for production of unvulcanized tyres, consisting of a central axis and two circular segments arranged around an axis to support the bead cores, means for radial expansion of those parts of the tyre components which are situated between the circular segments. The drum being at the other side, outside the circular segments, provided with two sets of hinged arms, which a re able to move axially and to expand radially and are, at the end adjacent to the circular segments, provided with rollers for turning-up those tyre components, which are located at the outer side of the circular segments. The circular segments are spaced apart of each other at a certain distance, while each of them consists of several parts. Each part of the circular segments is provided at its inner side, i. e. in the space between the circular segments, with an inner support for the bead core. The inner support for the bead core is pivotally joined with the respective segment part and during the operation of turning-up it lifts and supports the bead wire from the inner side, thus preventing its displacement inwards between the circular segments.

Any of these known solutions either prevents displacement of the bead wires during the tyre production insufficiently or can be utilized only at a certain type of a building drum. For example, the solution according to WO98/52740 can not be used with the building drums having a fixed central part, because they do not provide enough space for rotating the inner support for supporting the bead wire in the course of production.

DISCLOSURE OF INVENTION

The above shortcomings and disadvantages are eliminated by a tyre building drum with turn-up device according to the present invention for production of unvulcanized tyres, which drum consists of a central bearing hollow shaft attached to a flange of a driving spindle and to inlets for pressure media for controlling the respective mechanisms of the building drum. A spindle provided with means for ensuring axial movement of the respective parts of the building drum by means of two displacement bodies, right and left, extends through the centre of a horizontally located bearing hollow shaft. Two identical halves of the building drum are axially movably arranged opposite to each other around the central bearing hollow shaft at both sides of a vertical symmetry plane. Each half of the building drum consists of one set of L-shaped lever arms, which are arranged around the hollow shaft and together form two cylindrical surfaces to carry the tyre components. The lever arms of one half of the drum are arranged opposite to the lever arms of the other half of the drum, wherein the adjacent end of each of the lever arms carries a roller and the distant ends of the lever arms are hingedly embedded in a seating, which is common for each set of lever arms. The seating for lever arms is adapted also for axial movement through the means for axial movement, which are commonly used in tyre building drums and are not a subject-matter of the present invention. The form of lever arms and hinged embedding of the lever arms in a seating allow after all their radial movement. Around each set of lever arms, there are arranged at least two circumferential elastic belts acting as pulling means. The structure of a building drum with lever arms, their hinging embedding in a seating for lever arms, as well as their function are described in the patent DE 4416514. Between these two sets of lever arms, i. e. at the sides provided with rollers, there are on both sides of the vertical symmetry plane located mechanisms for supporting and stabilising the bead wires from both sides, the mechanisms consisting of two guiding discs bearing on their entire periphery segments, which form the seating for accommodating the bead wires, and segments for supporting the bead wires during tyre forming, turning up the bead wires, the sidewalls and stitching.

The first guiding disc is arranged closer to the vertical symmetry plane and, at its side further apart from the vertical symmetry plane, it is provided with means for attaching the clamping bead segments, the means allowing to move the clamping bead segments in radial direction. Each of the clamping bead segments consists of a segment body, which is provided with a fixing element complementary to the means of the disc, for attaching to the first guiding disc. In the segment body, there is a space created in the form of a horizontal letter H, the bottom of which is the bearing surface. Means for firm clamping of a rubber sleeve and a recess for accommodating an elastic ring are provided in the upper part of the clamping bead segment. The bottom part of the clamping bead segment is provided with an inclined surface. Inclined surfaces of the entire set of clamping bead segments form a conical surface for co-operating with a mechanism for radial lift of the clamping bead segments. The mechanism for controlling the radial lift of the clamping bead segments is formed, for example, by a pressure air cylinder with a piston, which is provided with conical surface. The air cylinder is further equipped with springs for return motion. The clamping bead segment further comprises a guiding surface, which is supported and slides on the interior side of the second guiding disc.

The first guiding disc is preferably formed as an elongated flange of the pressure air cylinder of the mechanism for controlling the radial lift of the clamping bead segments.

The second guiding disc is arranged further apart from the vertical symmetry plane and is, like the first guiding disc, provided at its side further apart from the symmetry plane with means for attaching the set of supporting segments, wherein the means allow the supporting segments to be moved in radial direction. Each of the supporting segments consists of a body, which is provided with a fixing element complementary to the means of the disc for attaching to the second guiding disc of supporting segments, a pair of supporting arms, interconnected by a bridge which, together with the arms, abuts on the bearing surface of the clamping bead segment into the space formed in the body of the clamping bead segment, when the drum is in the starting position. The supporting segment is further provided with a supporting (guiding) surface of the lever arm rollers, with at least one recess for accommodating the elastic ring and, at the bottom side, by an inclined surface. Inclined surfaces of the entire set of supporting segments form a conical surface for co-operating with the mechanism for radial lift of the supporting segments. The mechanism for controlling radial lift of the supporting segments is formed, for example, by a pressure air cylinder with a piston, provided with conical surface.

Both types of segments, the clamping bead segment and the supporting segment, may contain lightening openings to reduce their weight.

Surfaces of both types of segments, the clamping bead segments and the supporting segments, located on the guiding discs, are overlapped by a bead rubber sleeve, which is fixed by one its ends on the first guiding disc, and by its other end on the upper part of the clamping bead segment by means for its firm clamping. The rubber sleeve has a rim extending to the outer side to overlap the outer supporting arms of the supporting segments. The bead rubber sleeve serves to seal the inner space of the drum, to prevent damaging the produced tyre by the metal arms of the supporting segments and, simultaneously, it forms a seating for the bead wire at the place of attachment to the clamping bead segments.

A building drum according to the present invention allows to create a carcass assembly of a cylindrical shape, to expand it to a toroidal shape, to join these carcass materials with the belt-tread assembly prepared in advance, and to turn up the bead wires and form the tyre sidewalls with the bead wires supported and stabilized in such a way that during these operations no displacement or movement of the bead wires occurs. A building drum according to the present invention allows the bead wires to be supported from both sides, i.e. both bead wires are supported from the outer side by the exterior supporting arm of the supporting segment and from the inner side by the inner supporting arm of the supporting segment.

The subject-matter of the invention is also a method of production of unvulcanized tyres on a tyre building drum according to the present invention.

The carcass materials and sidewalls are placed on the building drum to form the carcass assembly or a complete carcass assembly which has been produced on a different equipment is brought to it. A carcass assembly of the form of a cylinder jacket usually consists of the inner rubber, several layers of carcass plies and sidewall bands to form the tyre sidewalls. Simultaneously or subsequently, bead wires are brought immediately over the drum adjusted in the proper position over the bead seatings.

The building drum increases its diameter by action of the mechanism for controlling radial lift of the clamping bead segments by pushing out the piston of the pressure air cylinder, whereby the piston cooperates by its conical surface with the conical surface of the clamping bead segments. Being pushed out of the basic position the clamping bead segments carry the bridge and arms of the supporting segments on their bearing surface, so that also the supporting segments reach a radially extended position. With this extending the segments the drum increases its diameter by 20 to 35 mm, depending on the type of tyres produced. The bead wires, which have been placed over the level of materials located on the building drum, are softly attached to the carcass materials at a given place, and then both halves of the building drum are displaced against each other to loosen the carcass materials located between the bead wires. Subsequently the supporting segments are pushed out by means of the mechanism for controlling radial lift of the supporting segments, and the supporting arms of the supporting segments support the bead wires so that the subsequent operations, like inflating the carcass assembly into a toroidal shape, joining with the belt-tread assembly prepared in advance, the turn-up process by means of lever arms, as well as the stitching process to press the belt-tread assembly against the carcass materials in the toroidal form and finishing the green tyre edges are performed with the supporting arms of the supporting segments of the building drum extended, so that no displacement of the bead wires during the green tyre production occurs.

We can state in more detail that the first stage of clamping the bead wires by means of the mechanism for controlling radial lift of clamping bead segments is performed using a pressure which is sufficient to "glue" the bead wires to the tyre carcass, but it doesn't induce a change in the shape of the carcass materials as has been usual so far. A force which is approximately a half or less of that used so far is sufficient to "glue" the bead wires softly. According to the existing method, the pressure exerted when increasing the building drum diameter was so high as to press the bead wires into the seating to retain them in place during the subsequent operations, at which the pressures act in various directions, because the bead wires had no further support or possibly only a support from the inner side and then undesirable deformation of the carcass occurred.

A further step in production of a tyre according to the present invention is an axial displacement of both drum halves against each other, the so called bead approaching, whereby the carcass materials between the beads are loosened, so that pushing out the supporting arms of the supporting segments does not cause such deformation which might damage the carcass assembly, presenting itself in better quality of product. Supporting the beads from both sides ensures their stability in the intended position. Also in some of the methods of green tyre production used so far, there occurs the loosening of the carcass material between the bead segments of the drum (bead approaching), but this loosening is performed only after firm fixing the beads on carcass materials, whereas in the method according to the present invention the firm clamping and stabilisation of the bead wires occurs only after the supporting arms have been expanded, thus after the carcass assembly has been loosened.

The operation of turning up the bead wires with cores by the edges of the carcass assembly and pressing the sidewall band against the inflated carcass assembly in the form of a toroid to form the tyre sidewall can be performed by a single axial and radial movement of lever arms provided at their ends with rollers in cooperation with further mechanisms of the building drum, like the means for controlling the axial movement.

An advantage of the building drum according to the present invention consists in that its structure allows such method of green tyre production at which the deformation effects of forces and mechanisms on the carcass materials are eliminated, and thus no undesired deformation of carcass materials, and consequently no decreasing of product quality occurs. Simultaneously, lesser wearing of certain parts of the building drum is achieved, because the magnitudes of pressures for clamping the bead wires used in the method of green tyre production according to the present invention are half or less of those used so far. A further advantage of the building drum according to the present invention is the fact that both kinds of segments are replaceable, so that actually all tyre types can be produced.

BRIEF DESCRIPTION OF DRAWINGS

In the enclosed drawings FIG. 2 and 3 show schematically longitudinal sections through the middle part of the upper half of the building drum, where in FIG. 2 the drum is in the basic position and in FIG. 3 it is in the final operation position. FIG. 8 shows the position when the supporting arms support the bead wire from both sides.

EXAMPLES

Figure 1:
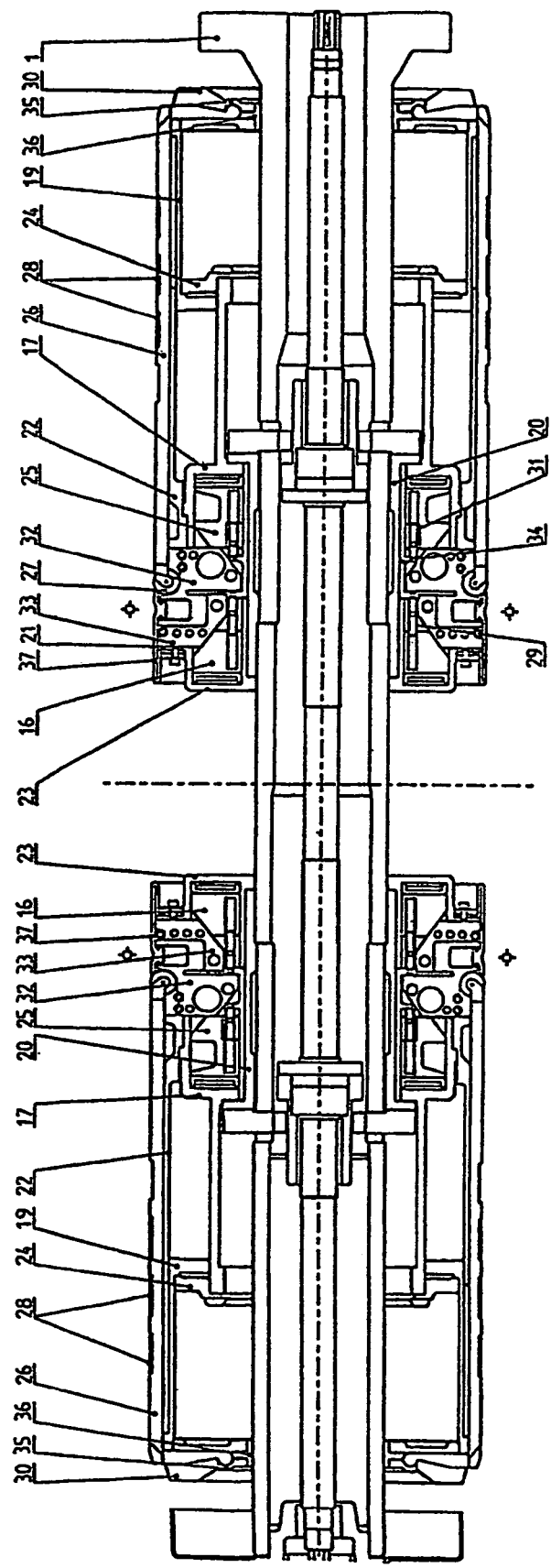
FIG. 1 shows schematically a longitudinal section through the building drum.

A lever building drum for unvulcanized tyre production according to the present invention is shown in FIG. 1, in which the reference sign 1 designates the central bearing hollow shaft which is joined with the flange of the driving spindle. The central bearing hollow shaft 1 is situated horizontally and it is joined with the inlets for pressure media for controlling the respective mechanisms of the building drum. A spindle equipped with means, which ensure axial movement of the respective parts of the building drum extends through the middle of the central bearing hollow shaft. In this case the means are represented by a kinetic screw with nuts connected with the right and the left body 20 of axial displacement by means of arms. Two identical halves of the building drum are axially movably arranged opposite each other relative to a vertical symmetry plane. Each half of the building drum consists of one set of L-shaped lever arms 26 which are arranged around the hollow shaft 1 and together form two cylindrical surfaces for carrying the tyre components. The lever arms 26 of one half of the drum are arranged opposite the lever arms 26 of the other half of the drum, wherein the adjacent end of each of the lever arms bears a roller 27 and the ends of the lever arms further apart are swingingly attached in a seating which is common for each set of lever arms. The seating for lever arms is adapted for axial movement by the means for axial movement and it consists of a bush 36, a sleeve 35 and a holder 30. The shape of the lever arms and their swinging attachment in the seating for lever arms enable after all their movement in radial direction. At least two circumferential elastic belts 28 are arranged around each set of lever arms.

Between the two sets of lever arms 26, i. e. at the side provided with rollers 27, there are at both sides of a vertical symmetry plane arranged two guiding discs 21, 34, bearing along their entire periphery segments 33, 32. The first guiding disc 21 is provided with means for carrying and radial displacement of clamping bead segments 33, which means are in this case T-shaped grooves. The second guiding disc 34 is provided with means for carrying and radial displacement of supporting segments 32. The means are, like at the first guiding disc 21, T-shaped grooves (see FIG. 6, 7 and 8).

To the right and left axial movement body 20, there are attached a mechanism for radial lift and guiding the clamping bead segments 33, a mechanism for radial lift and guiding the supporting segments 32, and a mechanism for performing the working movement of the lever arms 26.

The mechanism for radial lift of the clamping bead segments 33 consists of a pressure air cylinder 23 with a piston 16, which is equipped with conical surface. The air cylinder 23 is provided with springs 29 for return motion of pistons 16 and with a flange, which constitutes the first guiding disc 21 carrying a set of clamping bead segments 33 around which is arranged an elastic ring.

Figure 4:
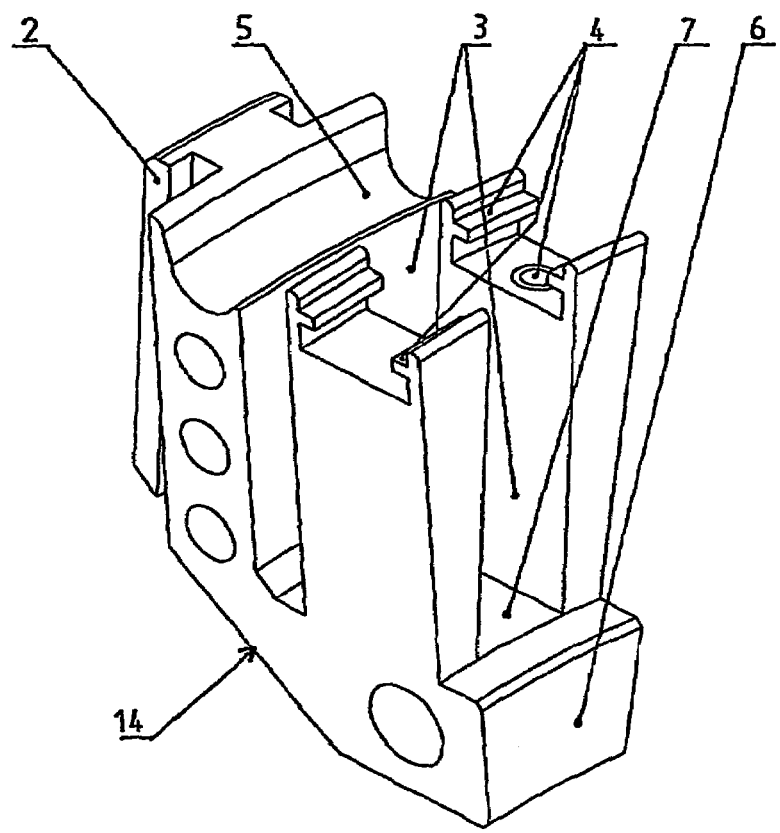
FIG. 4 shows one clamping bead segment.

A clamping bead segment 33, shown in FIG. 4, consists of a segment body provided with a clamping element 2 for connecting it to the first guiding disc 21. In the segment body, there is created a space 3, the bottom of which is formed by a bearing surface 7 having a shape of a horizontal letter H. A means 4 for airtight attachment of a bead rubber sleeve 37 and a recess 5 for accommodating the elastic ring 13 are created in the upper part of the clamping bead segment 33. The bottom part of the clamping bead segment 33 is provided with an inclined surface 14. The inclined surfaces 14 of the entire set of clamping bead segments 33 form a conical surface for cooperation with the conical surface of piston 16 of the mechanism for radial lift of the clamping bead segments. The clamping bead segment 33 further includes a guiding surface 6 at the opposite side relative to the fixing element 2. The guiding surface 6 abuts on and slides along the inner side of the second guiding disc 34. The clamping bead segment 33 is provided with four lightening openings which are not designated with reference signs, but are designated by circlets in FIGS. 1 and 4.

The mechanism for controlling radial lift of the supporting segments 32 is formed by clamping means of the second guiding disc 34, intended for carrying and radial displacement of the supporting segments 32, and a pressure air cylinder 17 with piston 25 provided with a conical surface. The pressure cylinder 17 is further provided with a spring 31 for return motion of the piston 25. Two elastic rings 13 are disposed around the supporting segments 32 to secure their position.

Figure 5:
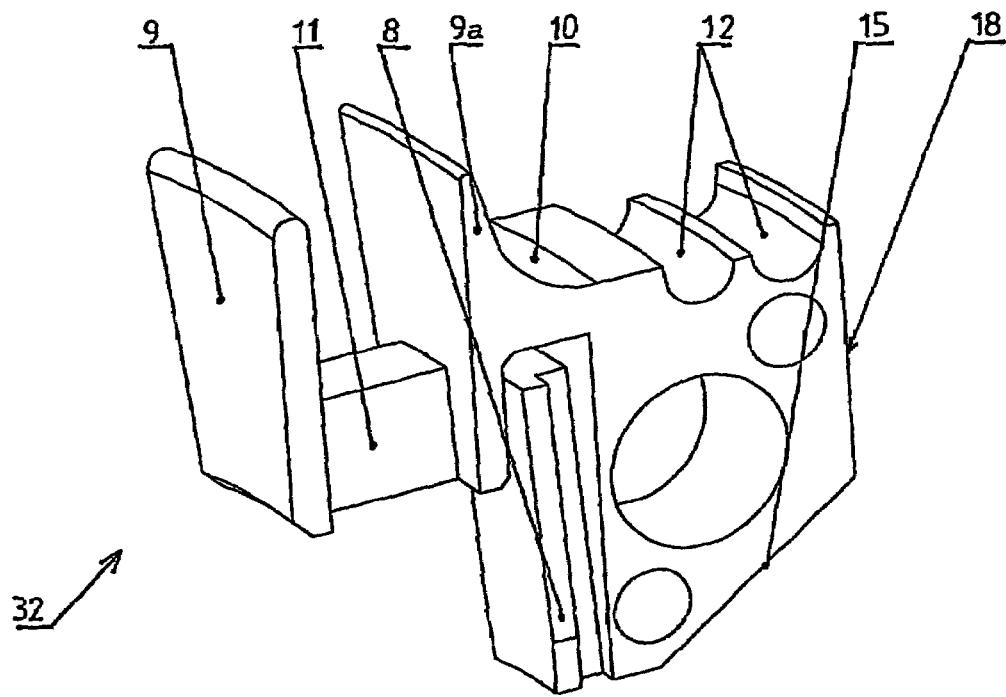
FIG. 5 shows one supporting segment of the mechanism for clamping and supporting the bead wires.

A supporting segment 32 is shown in FIG. 5 and consists of a body which is provided with a fixing element 8 for connecting it to the second guiding disc 34 of the supporting segments 32, a pair of supporting arms 9, 9a interconnected by a bridge 11 which, together with the arms, abuts the bearing surface 7 of the clamping bead segment 33 within the space 3 of the body of the clamping bead segment 33 when the drum is in its basic position. The supporting segment 32 is further provided with a supporting (guiding) surface 10 for rollers 27 of the lever arms, with two recesses 12 for receiving the elastic ring 13, and from the bottom side it has an inclined surface 15. The inclined surfaces 15 of the entire set of supporting segments form a conical surface for co-operating with the conical surface of piston 25 of the mechanism for radial lift of the supporting segments. The supporting segment 32 further includes a guiding surface 18 at the opposite side relative to the fixing element 8. The guiding surface 18 abuts on and slides along the cylinder 22. The supporting segment is provided with three lightening openings, which a re not designated with reference signs and are designated by circlets in FIGS. 1 and 5.

Figure 6:
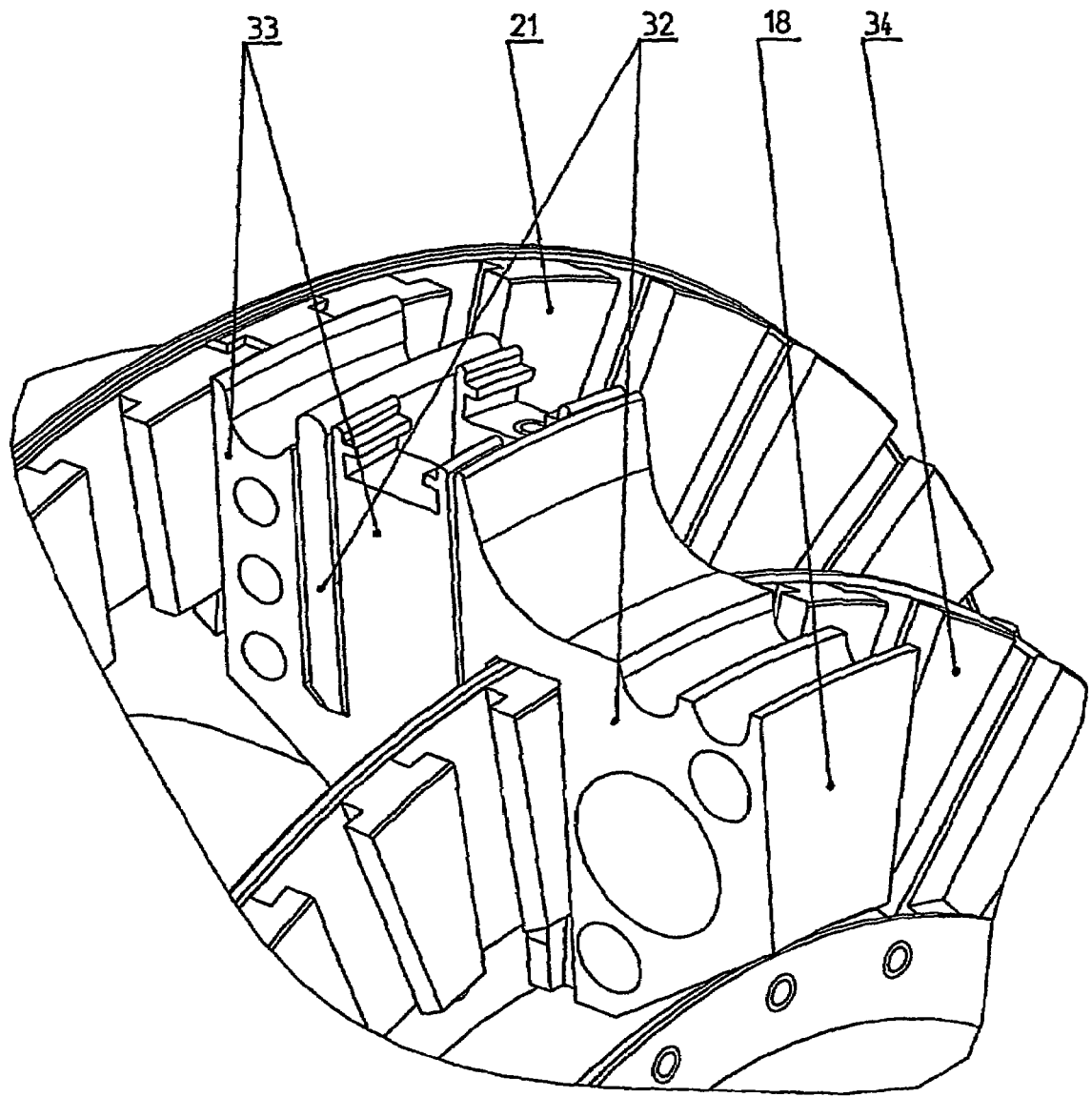
FIGS. 6, 7 and 8 show the section of the mechanism for clamping and supporting the bead wires with one pair of segments, wherein in FIG. 6 the drum is in the staring position, in FIG. 7 the drum is in a position when clamping the bead wires.
Figure 7:
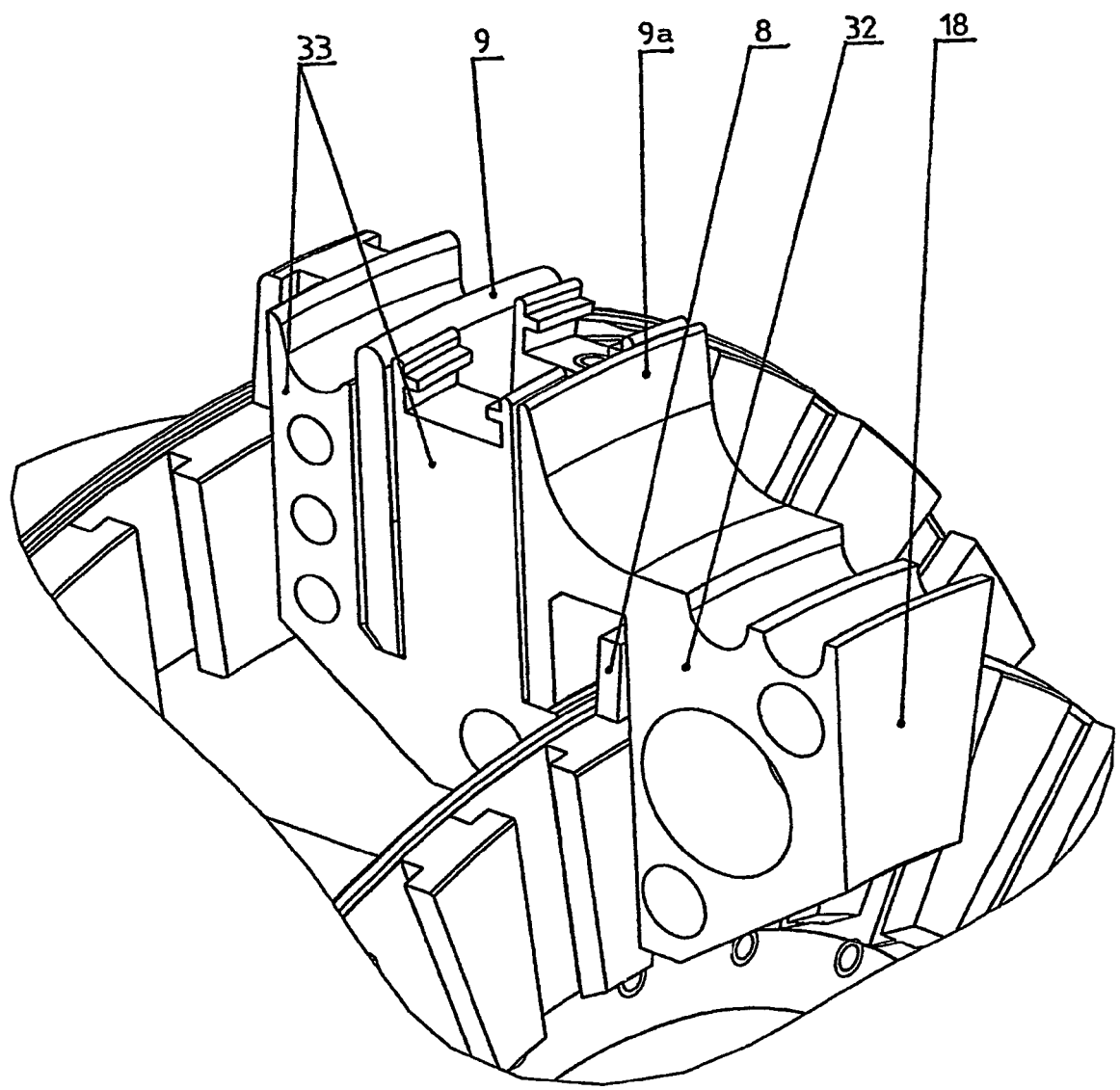
Figure 8:
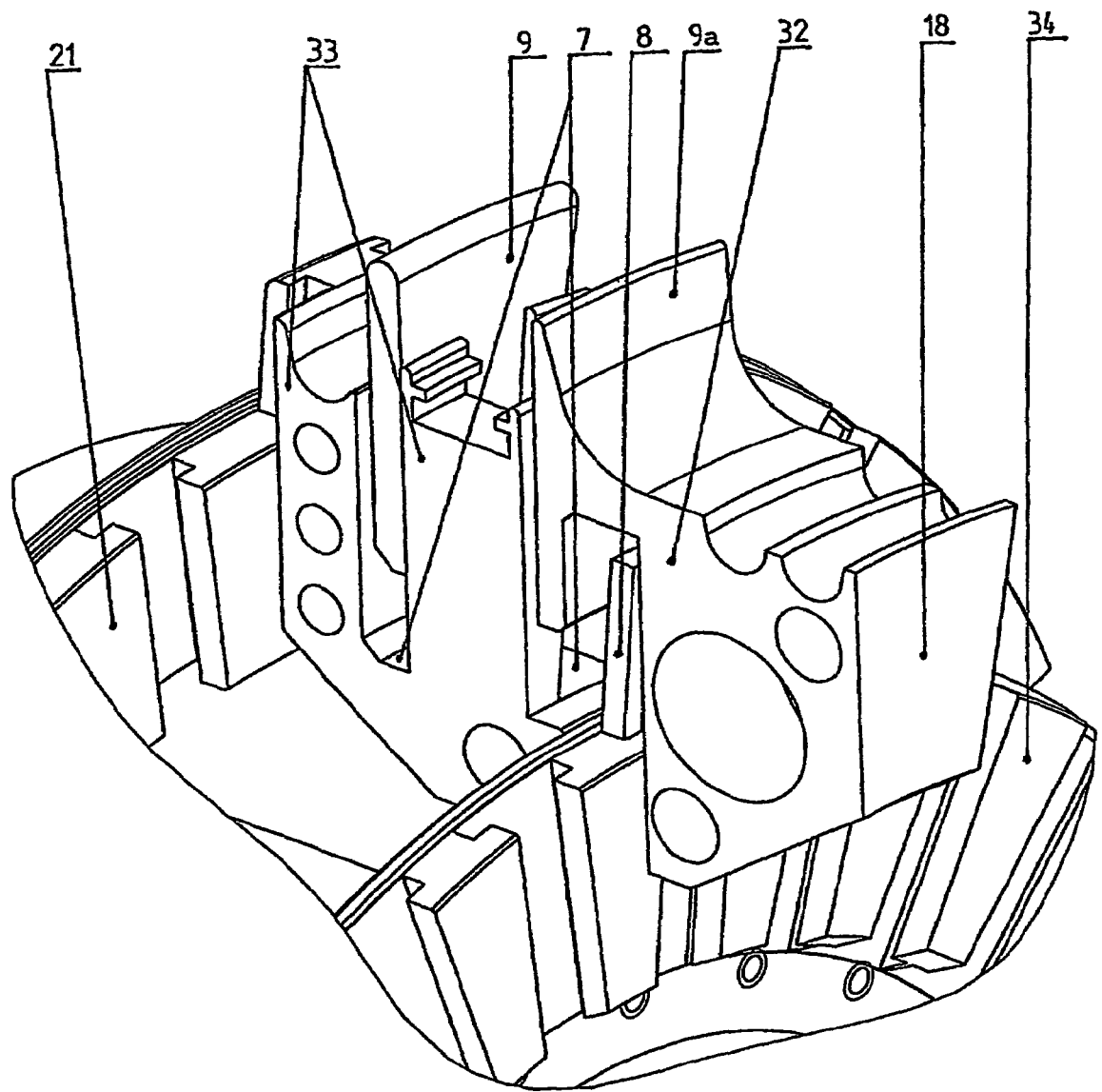

The arrangement of the first guiding disc 21 and the second guiding disc 34 with only one (for clarity) clamping bead segment 33 and one supporting segment 32 mounted is illustrated in FIGS. 6, 7 and 8, which represent perspective views on sections of the same part of the building drum mechanism, but at different stages of tyre production. In FIGS. 6, 7 and 8 one can clearly see the clamping means of guiding discs 21, 34, which are provided as T-shaped grooves and are complementary to the fixing means 2 and 8 of the clamping bead segment 33 and the supporting segment 32.

FIG. 2 shows a sectional view of the upper part only of the building drum in the basic position, where the arrangement of the guiding discs 21, 34 and of the segments 32, 33 is the same as shown in the perspective cutout view in FIG. 6.

FIG. 7 shows a perspective view of a cutout of the building drum mechanism which has increased its diameter by means of the mechanism for controlling radial lift of the clamping bead segments 33 by pushing out piston 16 of the pressure air cylinder 23, wherein piston 16 cooperates by its conical surface with the conical surface of the clamping bead segments 33. The clamping bead segments 33 in the pushed-out position carry the bridge 11 and the arms 9, 9a of the supporting segments 32 on their bearing surface 7, thus also the supporting segments 32 get into a radially displaced position.

FIG. 3 shows a sectional view also of the upper part only of the building drum, when the lever arms 26 are in a working position and press the sidewall material against the inflated carcass assembly, the supporting arms 9, 9a of the supporting segment 32 being pushed out as well. This arrangement of the- guiding discs 21, 34 and of the segments 32, 33 corresponds to the perspective view of a cutout shown in FIG. 8, where the final position is shown of the supporting segments 32 that have been pushed out from the position shown in FIG. 7 by piston 25 with conical surface and the air cylinder 17 of the mechanism for controlling radial lift of the supporting segments 32.

The reference sign 37 designates a bead rubber sleeve which can be clearly seen in FIGS. 2 and 3. One end of the bead rubber sleeve 37 is fixed on the first guiding disc 21 in airtight manner by means of a washer and screws and its other end is fixed in airtight manner in the means 4 of the clamping bead segment 33 and the sleeve serves for sealing the inner space of the drum, overlapping the metal parts of the drum which come into contact with the produced tyre, and it forms a seating for clamping the bead wires. The bead rubber sleeve 37 is provided with a rim extending over the supporting arms 9a of the supporting segments 32.

The mechanism ensuring the working movement of the arms 26 which are provided at one end with rollers 27 is formed by a pressure air cylinder 17, a piston 24, an air cylinder 19 and a cylinder 22, as well as by a sleeve 35, a bush 36 and a holder 30 of the lever arms 26.

As the cross-section of the building drum is circular, the air cylinder adopts the form of a hollow disc and the piston has the form of a disc with conical surface.

Figure 9:
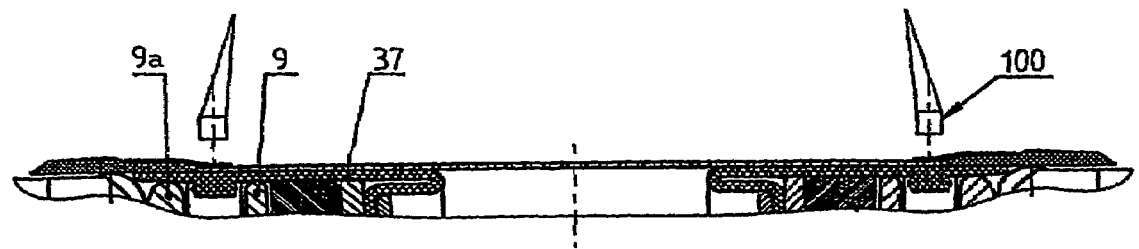
FIG. 9 to 13 show schematically that part of the tyre production method in which clamping and supporting the bead wires takes place.

The method of unvulcanized tyre production on a building drum according to the present invention shown in FIG. 1 includes loading the carcass materials 101 and sidewalls 102 on the surface of the drum in the basic position (FIGS. 1, 2 and 6) and subsequent forming the carcass assembly, or a completed carcass assembly produced in a different equipment is fed. The carcass assembly in the form of a cylinder jacket usually consists of an inner rubber, several layers of carcass plies 101 and sidewall bands 102 to form the sidewalls of the tyre. Simultaneously or subsequently, the bead wires 100 are brought close over the drum, the bead wires being adjusted to appropriate positions over the bead seatings formed by the clamping bead segment 33 and the bead rubber sleeve 37. This situation is shown in FIG. 9.

Figure 10:
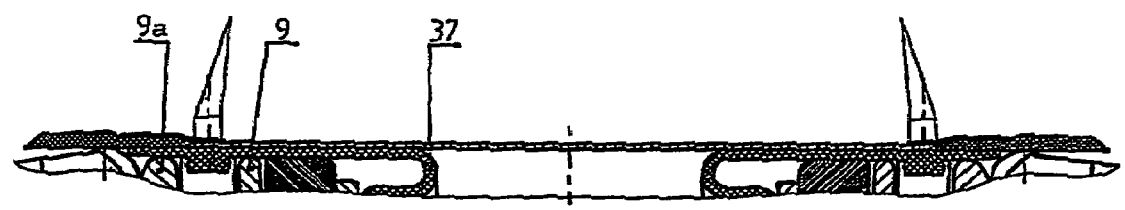

In the first phase of the production process, the building drum increases its diameter as shown in FIG. 7 by the action of the mechanism for controlling radial lift of the clamping bead segments 33 by pushing out piston 16 of the pressure air cylinder 23, wherein the piston 16 cooperates by its conical surface with conical surface 14 of the set of clamping bead segments 33. When pushed out of their basic position, the clamping bead segments 33 carry the bridge 11 and the arms 9, 9aof the supporting segments 32 on their bearing surface 7, thus also the supporting segments 32 get into a radially pushed-out positioned. The bead wire 100 which was positioned over the level of materials 101, 102 loaded on the building drum, is softly attached (fastened) to the carcass materials at an intended place as shown in FIG. 10. A pressure of 0.25 to 0.45 MPa is sufficient to fasten the bead wires 100 by the method according to the present invention, while a pressure of 0.6 to 0.8 MPa has been used so far depending on the kind of the tyre produced.

Figure 11:
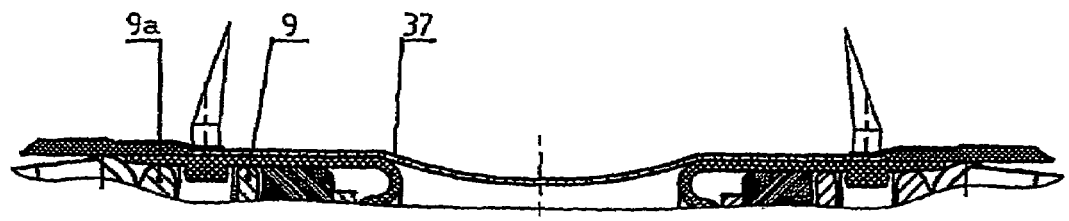

Subsequently, both halves of the building drum are brought closer against each other by the means for axial displacement of the drum, and the carcass materials 101 located between the bead wires 100 are loosened. The situation is shown in FIG. 11.

Figure 12:

In a further production phase, by the action of the mechanism for controlling radial lift of the supporting segments, the supporting segments 32 are pushed out and the supporting arms 9, 9a of the supporting segments 32 support the bead wires 100 from both sides. This situation is shown in FIG. 12.

Figure 13:
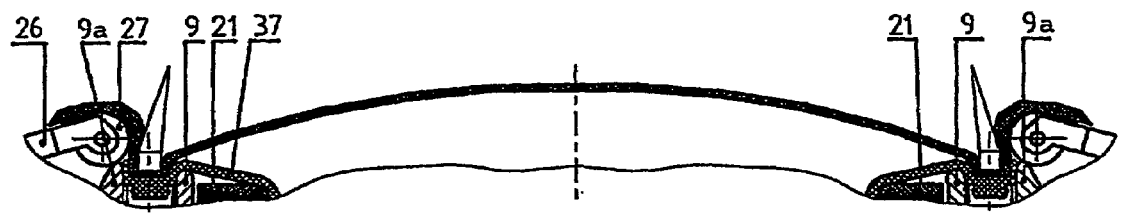

FIG. 13 shows a situation in which the subsequent operations start to be performed after the bead wires 100 have been supported from both sides.

The subsequent operations of the green tyre production on a building drum, like inflating the carcass assembly 101 into the form of a toroid, connecting with a belt-tread assembly prepared in advance, the process of wrapping and turning up by the lever arms 26, as well as the stitching process to press the belt-tread assembly against the carcass materials 101 in the form of a toroid and forming the green tyre edges are performed with pushed out supporting arms 9, 9a of the supporting segments 32 of the building drum, so that no displacement of bead wires occurs during the green tyre production.

These subsequent operations of the green tyre production will not be described in detail in the following, as they are well known and are not a subject-matter of the present invention.

The invention claimed is:

1. A tyre building drum with turn-up device for production of unvulcanized tyres from the components, like a carcass assembly, tyre sidewalls, belt-tread assembly and two bead wires, wherein the drum consists of a horizontally disposed central bearing hollow shaft (1) with a driving spindle extending through the centre of the bearing hollow shaft, the bearing hollow shaft (1) being provided with air distributing means to pneumatic mechanisms for controlling functions of the drum and means for axial movement of both lateral parts of the drum, arranged at both sides of a vertical symmetry plane and formed by two sets of lever arms (26) which are, at the side facing the centre, provided with pivotally mounted rollers (27) and the other side of the lever arms (26) is swingingly attached in a seating common to each set of arms (26), wherein each set of arms (26) is provided with at least one circumferential elastic belt (28) encircling the lever arms (26), the lever arms (26) forming two cylindrical surfaces around the horizontal hollow shaft, characterized in that between the two sets of lever arms (26) with rollers (27), there is at both sides of a vertical symmetry plane disposed a mechanism for supporting the bead wires from both sides, which consists of:
   an axially movably arranged first guiding disc (21) with radially movably arranged clamping bead segments (33) around its entire periphery, adapted to cooperate with a mechanism for controlling radial lift of the clamping bead segments (33) and
   an axially movably arranged second guiding disc (34) which is located further apart from the vertical symmetry plane and around its entire periphery provided with radially movably arranged supporting bead segments (32) adapted to cooperate with a mechanism for controlling radial lift of the supporting bead segments (32),
   a mechanism for controlling radial lift of the clamping bead segments, provided with means for cooperating with the clamping bead segments (33),
   a mechanism for controlling radial lift of the supporting bead segments (32), provided with means for cooperating with the supporting bead segments (32),
   a bead rubber sleeve (37) which forms a seating for the bead wires (100) and separates airtightly the inner space of the drum,
   clamping bead segments (33) radially movably arranged on the first guiding disc (21) and provided with means for cooperating with the mechanism for controlling radial lift of the clamping bead segments (33),
   supporting bead segments (32) radially movably arranged on the second guiding disc (34), provided with means for cooperating with the mechanism for controlling radial lift of the supporting bead segments (32), each of the supporting bead segments (32) comprises a pair of supporting arms (9, 9a) which support bead wires from both sides and a bridge (11) which interconnects said supporting arms (9, 9a),
   wherein the clamping bead segment (33) is provided with a space (3) for receiving the supporting arms (9, 9a) with a bridge (11) of the supporting bead segment (32) and a bearing surface (7) for simultaneous radial lift of the supporting bead segment (32) with the radial lift of the clamping bead segment (33) by the mechanism for controlling radial lift of the clamping bead segments (33).

2. A tyre building drum with turn-up device for production of unvulcanized tyres according to claim 1, characterized in that the first guiding disc (21) is, at its entire periphery, provided with means for attaching a set of clamping bead segments, wherein the means allow the clamping bead segments (33) to be moved in radial direction, and the second guiding disc (34) is, at its entire periphery, provided with means for attaching a set of supporting bead segments (32), wherein the means allow the supporting bead segments (32) to be moved in radial direction.

3. A tyre building drum with turn-up device for production of unvulcanized tyres according to claim 1, characterized in that the mechanism for controlling radial lift of the clamping bead segments (33) is formed by a pressure air cylinder (23) with piston (16), which is provided with conical surface which constitutes the means for cooperating with conical surface of the set of clamping bead segments (33), the air cylinder being further provided with a spring (29) for return motion of pistons (16) and with a flange, which forms the first guiding disc (21) with means for attaching a set of clamping bead segments (33).

4. A tyre building drum with turn-up device for production of unvulcanized tyres according to claim 1, characterized in that the mechanism for controlling radial lift of the supporting bead segments (32) is formed by a pressure air cylinder (17) with piston (25), provided with a conical surface which constitutes the means for co-operation with a conical surface of the set of supporting bead segments (32), the air cylinder (17) being further provided with a spring (31) for return motion of pistons (25).

5. A tyre building drum with turn-up device for production of unvulcanized tyres according to claim 1, characterized in that the bead rubber sleeve (37) is fixed by one of its ends in airtight manner on the first guiding disc (21) and by its other end is fixed in airtight manner on the clamping bead segment (33), the sleeve being at this second end provided with a rim, extending over the outer supporting arms (9a) of the supporting bead segments (32).

6. A tyre building drum with turn-up device for production of unvulcanized tyres according to claim 1, characterized in that each clamping bead segment (33) consists of a segment body which is at one side provided with a fixing element (2) for attaching to the means of the first guiding disc (21), at the opposite side with a guiding surface (6), in the upper part with a recess (5) for receiving an elastic ring (13) and with means (4) for airtight attaching a bead rubber sleeve (37), in the segment body being created a space (3), the bottom of which is formed by a bearing surface (7) in a form of a horizontal letter H for receiving the supporting arms (9, 9a) and the bridge (11) of the supporting bead segment (32), and in the bottom part the body of the segment (33) is provided with an inclined surface (14) for co-operating with conical surface of piston (16) of the mechanism for radial lift of the clamping bead segments (33).

7. A tyre building drum with turn-up device for production of unvulcanized tyres according to claim 1, characterized in that each supporting bead segment (32) consists of a body, which is at one side provided with a fixing element (8) for attaching to the means of the second guiding disc (34), at the opposite side with a guiding surface (18), in the upper part with at least one recess (12) for receiving an elastic ring (13), with a supporting surface (10) for the rollers (27) of the lever arms (26) and with a pair of supporting arms (9, 9a), interconnected by the bridge (11), for co-operating with the bearing surface (7) of the clamping bead segment (33), and in the bottom part the body of the segment (32) is provided with an inclined surface (15) for co-operating with conical surface of piston (25) of the mechanism for radial lift of the supporting bead segments (32).

8. A method of production of tyres on a tyre building drum according to claim 1, characterized in that it includes the following steps of:

winding the tyre components, like inner rubber, carcass plies and sidewall bands (102), on the surface of the building drum or bringing a complete carcass assembly prepared in advance with sidewalls in the form of a cylinder jacket onto the building drum and bringing and adjusting two bead wires (100) with cores to a correct position over seatings for the bead wires (100) of the building drum, expanding the carcass assembly by increasing the building drum diameter through pushing out the clamping bead segments (33) carrying supporting bead segments (32) by the mechanism for radial lift of the clamping bead segments (33) using such force that the bead wires (100) located over the seatings for bead wires are fastened to the carcass assembly (101) with no deformation of carcass components occurring, loosening the carcass components (101) located between the bead wires (100) by small axial advancing the drum halves against each other, supporting the bead wires (100) by extending the supporting arms (9, 9a) by radial lift of the supporting bead segments (32) by the mechanism for radial lift of the supporting bead segments (32), which stay in this position during all subsequent steps of tyre production, which include:

further approaching the beads of the tyre being produced and simultaneous inflating the carcass materials located between the beads into a form of a toroid for connecting it with a belt-tread assembly and winding the bead wires (100) and turning up the sidewalls (102) by pressing the tyre components situated at the outer side of the bead wires against the inflated carcass materials situated between the bead wires by the rollers (27) of the lever arms (26), stitching by pressing the belt-tread assembly from the outer side against the carcass materials (101) inflated into the form of a toroid.

9. A method of production of tyres on a tyre building drum according to claim 2, characterized in that it includes the following steps of:

winding the tyre components, like inner rubber, carcass plies and sidewall bands (102), on the surface of the building drum or bringing a complete carcass assembly prepared in advance with sidewalls in the form of a cylinder jacket onto the building drum and bringing and adjusting two bead wires (100) with cores to a correct position over seatings for the bead wires (100) of the building drum, expanding the carcass assembly by increasing the building drum diameter through pushing out the clamping bead segments (33) carrying supporting bead segments (32) by the mechanism for radial lift of the clamping bead segments (33) using such force that the bead wires (100) located over the seatings for bead wires are fastened to the carcass assembly (101) with no deformation of carcass components occurring, loosening the carcass components (101) located between the bead wires (100) by small axial advancing the drum halves against each other, supporting the bead wires (100) by extending the supporting arms (9, 9a) by radial lift of the supporting bead segments (32) by the mechanism for radial lift of the supporting bead segments (32), which stay in this position during all subsequent steps of tyre production, which include:

further approaching the beads of the tyre being produced and simultaneous inflating the carcass materials located between the beads into a form of a toroid for connecting it with a belt-tread assembly and winding the bead wires (100) and turning up the sidewalls (102) by pressing the tyre components situated at the outer side of the bead wires against the inflated carcass materials situated between the bead wires by the rollers (27) of the lever arms (26), stitching by pressing the belt-tread assembly from the outer side against the carcass materials (101) inflated into the form of a toroid.

10. A method of production of tyres on a tyre building drum according to claim 3 characterized in that it includes the following steps of:

winding the tyre components, like inner rubber, carcass plies and sidewall bands (102), on the surface of the building drum or bringing a complete carcass assembly prepared in advance with sidewalls in the form of a cylinder jacket onto the building drum and bringing and adjusting two bead wires (100) with cores to a correct position over seatings for the bead wires (100) of the building drum, expanding the carcass assembly by increasing the building drum diameter through pushing out the clamping bead segments (33) carrying supporting bead segments (32) by the mechanism for radial lift of the clamping bead segments (33) using such force that the bead wires (100) located over the seatings for bead wires are fastened to the carcass assembly (101) with no deformation of carcass components occurring, loosening the carcass components (101) located between the bead wires (100) by small axial advancing the drum halves against each other, supporting the bead wires (100) by extending the supporting arms (9, 9a) by radial lift of the supporting bead segments (32) by the mechanism for radial lift of the supporting bead segments (32), which stay in this position during all subsequent steps of tyre production, which include:

further approaching the beads of the tyre being produced and simultaneous inflating the carcass materials located between the beads into a form of a toroid for connecting it with a belt-tread assembly and winding the bead wires (100) and tning up the sidewalls (102) by pressing the tyre components situated at the outer side of the bead wires against the inflated carcass materials situated between the bead wires by the rollers (27) of the lever arms (26), stitching by pressing the belt-tread assembly from the outer side against the carcass materials (101) inflated into the form of a toroid.

11. A method of production of tyres on a tyre building drum according to claim 4, characterized in that it includes the following steps of:

winding the tyre components, like inner rubber, carcass plies and sidewall bands (102), on the surface of the building drum or bringing a complete carcass assembly prepared in advance with sidewalls in the form of a cylinder jacket onto the building drum and bringing and adjusting two bead wires (100) with cores to a correct position over seatings for the bead wires (100) of the building drum, expanding the carcass assembly by increasing the building drum diameter through pushing out the clamping bead segments (33) carrying supporting bead segments (32) by the mechanism for radial lift of the clamping bead segments (33) using such force that the bead wires (100) located over the seatings for bead wires are fastened to the carcass assembly (101) with no deformation of carcass components occurring, loosening the carcass components (101) located between the bead wires (100) by small axial advancing the drum halves against each other, supporting the bead wires (100) by extending the supporting arms (9, 9a) by radial lift of the supporting bead segments (32) by the mechanism for radial lift of the supporting bead segments (32), which stay in this position during all subsequent steps of tyre production, which include:

further approaching the beads of the tyre being produced and simultaneous inflating the carcass materials located between the beads into a form of a toroid for connecting it with a belt-tread assembly and winding the bead wires (100) and turning up the sidewalls (102) by pressing the tyre components situated at the outer side of the bead wires against the inflated carcass materials situated between the bead wires by the rollers (27) of the lever arms (26), stitching by pressing the belt-tread assembly from the outer side against the carcass materials (101) inflated into the form of a toroid.

12. A method of production of tyres on a tyre building drum according to claim 5, characterized in that it includes the following steps of:

winding the tyre components, like inner rubber, carcass plies and sidewall bands (102), on the surface of the building drum or bringing a complete carcass assembly prepared in advance with sidewalls in the form of a cylinder jacket onto the building drum and bringing and adjusting two bead wires (100) with cores to a correct position over seatings for the bead wires (100) of the building drum, expanding the carcass assembly by increasing the building drum diameter through pushing out the clamping bead segments (33) carrying supporting bead segments (32) by the mechanism for radial lift of the clamping bead segments (33) using such force that the bead wires (100) located over the seatings for bead wires are fastened to the carcass assembly (101) with no deformation of carcass components occurring, loosening the carcass components (101) located between the bead wires (100) by small axial advancing the drum halves against each other, supporting the bead wires (100) by extending the supporting arms (9, 9a) by radial lift of the supporting bead segments (32) by the mechanism for radial lift of the supporting bead segments (32), which stay in this position during all subsequent steps of tyre production, which include:

further approaching the beads of the tyre being produced and simultaneous inflating the carcass materials located between the beads into a form of a toroid for connecting it with a belt-tread assembly and winding the bead wires (100) and turning up the sidewalls (102) by pressing the tyre components situated at the outer side of the bead wires against the inflated carcass materials situated between the bead wires by the rollers (27) of the lever arms (26), stitching by pressing the belt-tread assembly from the outer side against the carcass materials (101) inflated into the form of a toroid.

13. A method of production of tyres on a tyre building drum according to claim 6, characterized in that it includes the following steps of:

winding the tyre components, like inner rubber, carcass plies and sidewall bands (102), on the surface of the building drum or bringing a complete carcass assembly prepared in advance with sidewalls in the form of a cylinder jacket onto the building drum and bringing and adjusting two bead wires (100) with cores to a correct position over seatings for the bead wires (100) of the building drum, expanding the carcass assembly by increasing the building drum diameter through pushing out the clamping bead segments (33) carrying supporting bead segments (32) by the mechanism for radial lift of the clamping bead segments (33) using such force that the bead wires (100) located over the seatings for bead wires are fastened to the carcass assembly (101) with no deformation of carcass components occurring, loosening the carcass components (101) located between the bead wires (100) by small axial advancing the drum halves against each other, supporting the bead wires (100) by extending the supporting arms (9, 9a) by radial lift of the supporting bead segments (32) by the mechanism for radial lift of the supporting bead segments (32), which stay in this position during all subsequent steps of tyre production, which include:

further approaching the beads of the tyre being produced and simultaneous inflating the carcass materials located between the beads into a form of a toroid for connecting it with a belt-tread assembly and winding the bead wires (100) and turning up the sidewalls (102) by pressing the tyre components situated at the outer side of the bead wires against the inflated carcass materials situated between the bead wires by the rollers (27) of the lever arms (26), stitching by pressing the belt-tread assembly from the outer side against the carcass materials (101) inflated into the form of a toroid.

14. A method of production of tyres on a tyre building drum according to claim 7, characterized in that it includes the following steps of:

winding the tyre components, like inner rubber, carcass plies and sidewall bands (102), on the surface of the building drum or bringing a complete carcass assembly prepared in advance with sidewalls in the form of a cylinder jacket onto the building drum and bringing and adjusting two bead wires (100) with cores to a correct position over seatings for the bead wires (100) of the building drum, expanding the carcass assembly by increasing the building drum diameter through pushing out the clamping bead segments (33) carrying supporting bead segments (32) by the mechanism for radial lift of the clamping bead segments (33) using such force that the bead wires (100) located over the seatings for bead wires are fastened to the carcass assembly (101) with no deformation of carcass components occurring, loosening the carcass components (101) located between the bead wires (100) by small axial advancing the drum halves against each other, supporting the bead wires (100) by extending the supporting arms (9, 9a) by radial lift of the supporting bead segments (32) by the mechanism for radial lift of the supporting bead segments (32), which stay in this position during all subsequent steps of tyre production, which include:

further approaching the beads of the tyre being produced and simultaneous inflating the carcass materials located between the beads into a form of a toroid for connecting it with a belt-tread assembly and winding the bead wires (100) and turning up the sidewalls (102) by pressing the tyre components situated at the outer side of the bead wires against the inflated carcass materials situated between the bead wires by the rollers (27) of the lever arms (26), stitching by pressing the belt-tread assembly from the outer side against the carcass materials (101) inflated into the form of a toroid.

* * * * *